United States Patent
Peterson et al.

(10) Patent No.: US 6,688,463 B2
(45) Date of Patent: Feb. 10, 2004

(54) DISC STORAGE CONTAINER

(75) Inventors: James N. Peterson, North Canton, OH (US); James M. Byrne, Massillon, OH (US); Kevin E. Myszka, Kent, OH (US); James K. Sankey, Hudson, OH (US); Jesus Cordero, Totowa, NJ (US)

(73) Assignee: Nexpak Corporation, Uniontown, OH (US)

( * ) Notice: Subject to any disclaimer, the term of this patent is extended or adjusted under 35 U.S.C. 154(b) by 79 days.

(21) Appl. No.: 09/965,034

(22) Filed: Sep. 26, 2001

(65) Prior Publication Data

US 2002/0053526 A1 May 9, 2002

Related U.S. Application Data

(60) Provisional application No. 60/246,388, filed on Nov. 7, 2000.

(51) Int. Cl.$^7$ ............................................... B65D 85/57
(52) U.S. Cl. ................................... 206/308.1; 206/310
(58) Field of Search ................................ 206/307, 310, 206/311, 312, 313, 308.1, 309

(56) References Cited

U.S. PATENT DOCUMENTS

| | | | |
|---|---|---|---|
| 5,586,651 A | 12/1996 | Krummenacher | |
| 5,944,181 A | * 8/1999 | Lau | 206/308.1 |
| 5,950,822 A | 9/1999 | Cloran et al. | |
| 5,996,788 A | 12/1999 | Belden, Jr. et al. | |
| 6,041,922 A | 3/2000 | Kollinek | |
| D433,266 S | 11/2000 | Peterson et al. | |
| D434,777 S | 12/2000 | Peterson et al. | |
| 6,227,362 B1 | * 5/2001 | Cheung | 206/308.1 |

* cited by examiner

Primary Examiner—Jacob K. Ackun
(74) Attorney, Agent, or Firm—Sand & Sebolt

(57) ABSTRACT

A storage container for a disc-shaped item of recorded media includes a hub that holds the disc-shaped item of recorded media by engaging the portion of the disc-shaped item of recorded media immediately adjacent the centrally-disposed opening of the disc-shaped item of recorded media. The hub includes three fingers that each include a holding projection that snap fits over the top of the disc-shaped item of recorded media. The container includes a ring that surrounds the hub so that the bottom of the disc-shaped item of recorded media does not engage the storage container. The outer circumference of the disc-shaped item of recorded media is supported by a circumferential ledge.

26 Claims, 4 Drawing Sheets

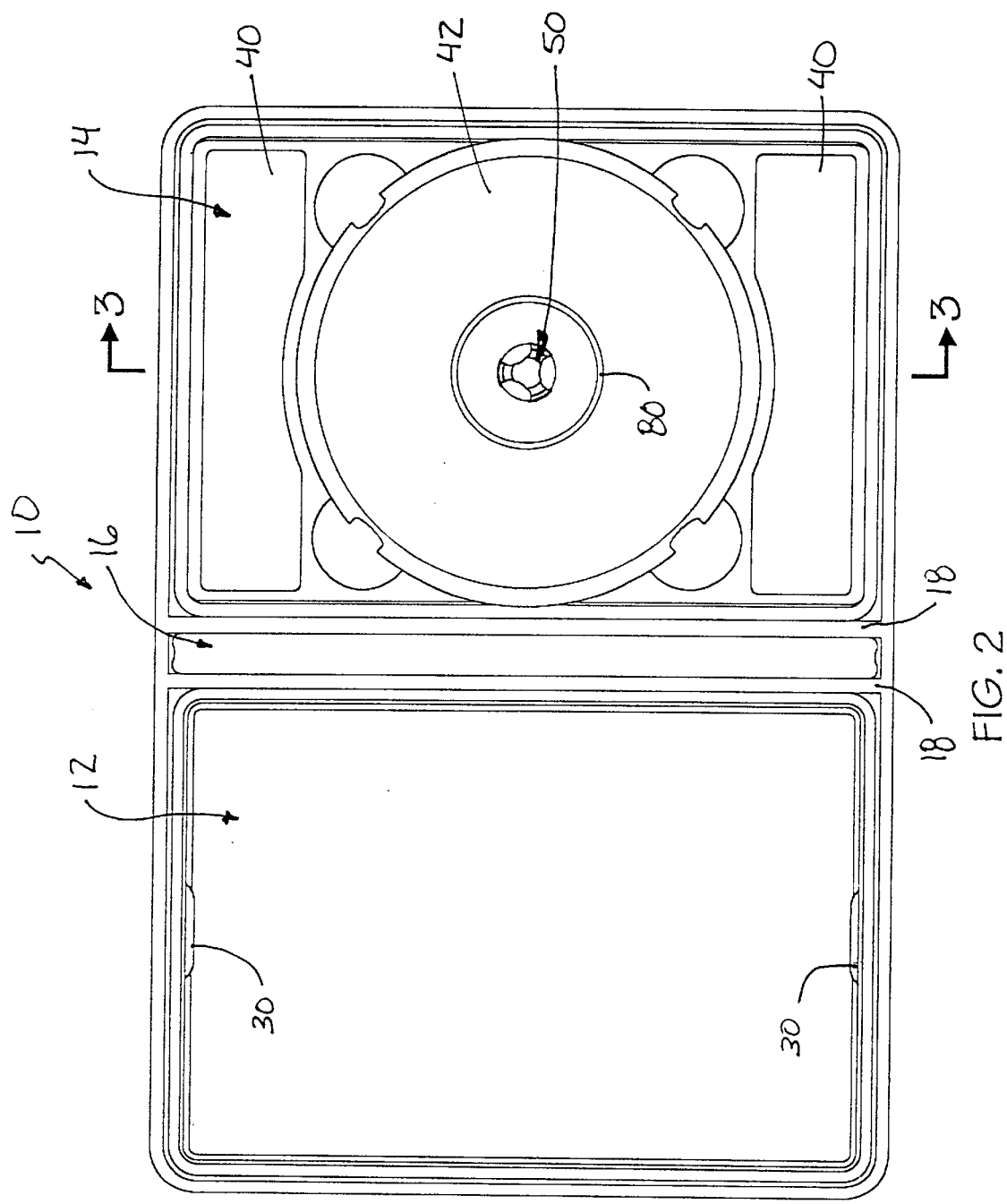

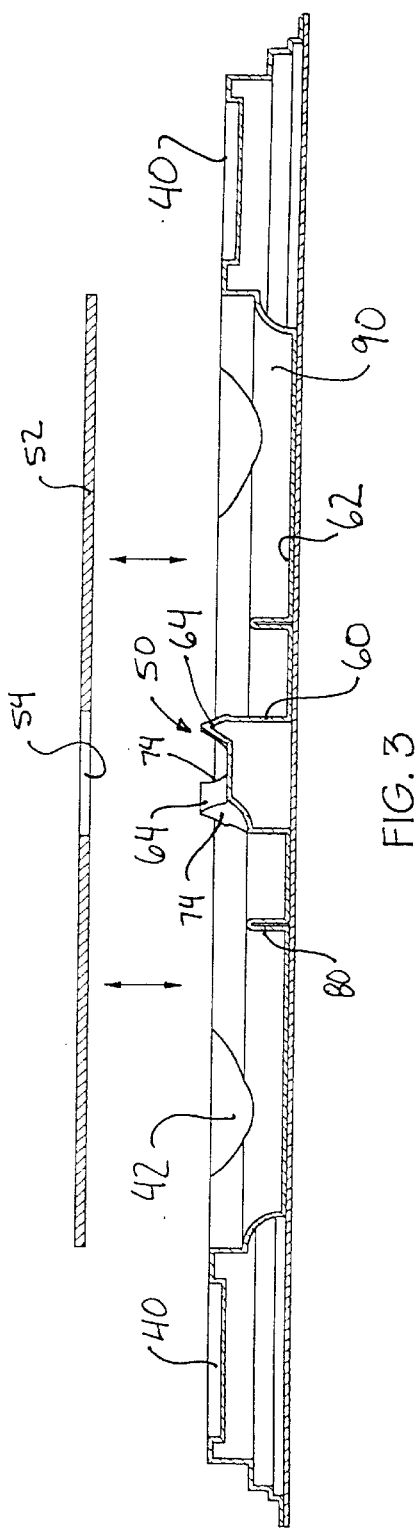
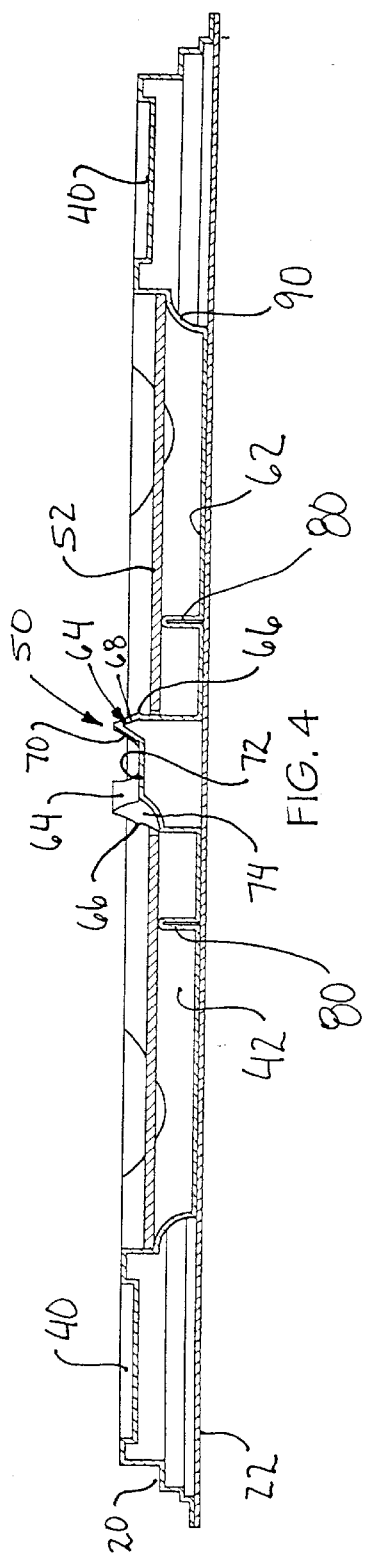

DISC STORAGE CONTAINER

CROSS REFERENCE TO RELATED APPLICATIONS

This application claims priority from U.S. Provisional Patent Application serial No. 60/246,388 filed Nov. 7, 2000; the disclosures of which are incorporated by reference.

BACKGROUND OF THE INVENTION

1. Technical Field

The invention generally relates to storage containers for recorded media. More particularly, the present invention relates to storage containers for disc-shaped items of recorded media such as CDs and DVDs.

2. Background Information

Numerous types of media are now sold on CDs and DVDs. Consumers and media sellers desire different types of packaging for the discs. Some types of packaging include retaining hubs having flexible fingers or push buttons that must be moved before a disc can be removed from the hub. Other types of hubs include relatively stationary components that slightly flex or deform when a disc is installed or removed. Despite the various existing hubs, room for improvement remains.

BRIEF SUMMARY OF THE INVENTION

The invention provides a storage container for a disc-shaped item of recorded media. The storage container includes a hub that holds the disc-shaped item of recorded media by engaging the portion of the disc-shaped item of recorded media immediately adjacent the centrally-disposed opening of the disc-shaped item of recorded media. The hub includes three fingers that each include a holding projection that snap fits over the top of the disc-shaped item of recorded media. The container includes a ring that surrounds the hub so that the bottom of the disc-shaped item of recorded media does not engage the storage container. The outer circumference of the disc-shaped item of recorded media is supported by a circumferential ledge.

The storage container also provides media-holding projections that hold printed literature in the container.

BRIEF DESCRIPTION OF THE SEVERAL VIEWS OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended claims.

FIG. 2 is a top plan view of the storage container of the present invention.

FIG. 3 is a sectional view taken along line 3—3 of FIG. 2 with a disc-shaped item of recorded media positioned above the hub.

FIG. 4 is a sectional view similar to FIG. 3 with the disc-shaped item of recorded media being held in the container by the hub.

Similar numbers refer to similar parts throughout the specification.

DETAILED DESCRIPTION OF THE INVENTION

Figure 1:
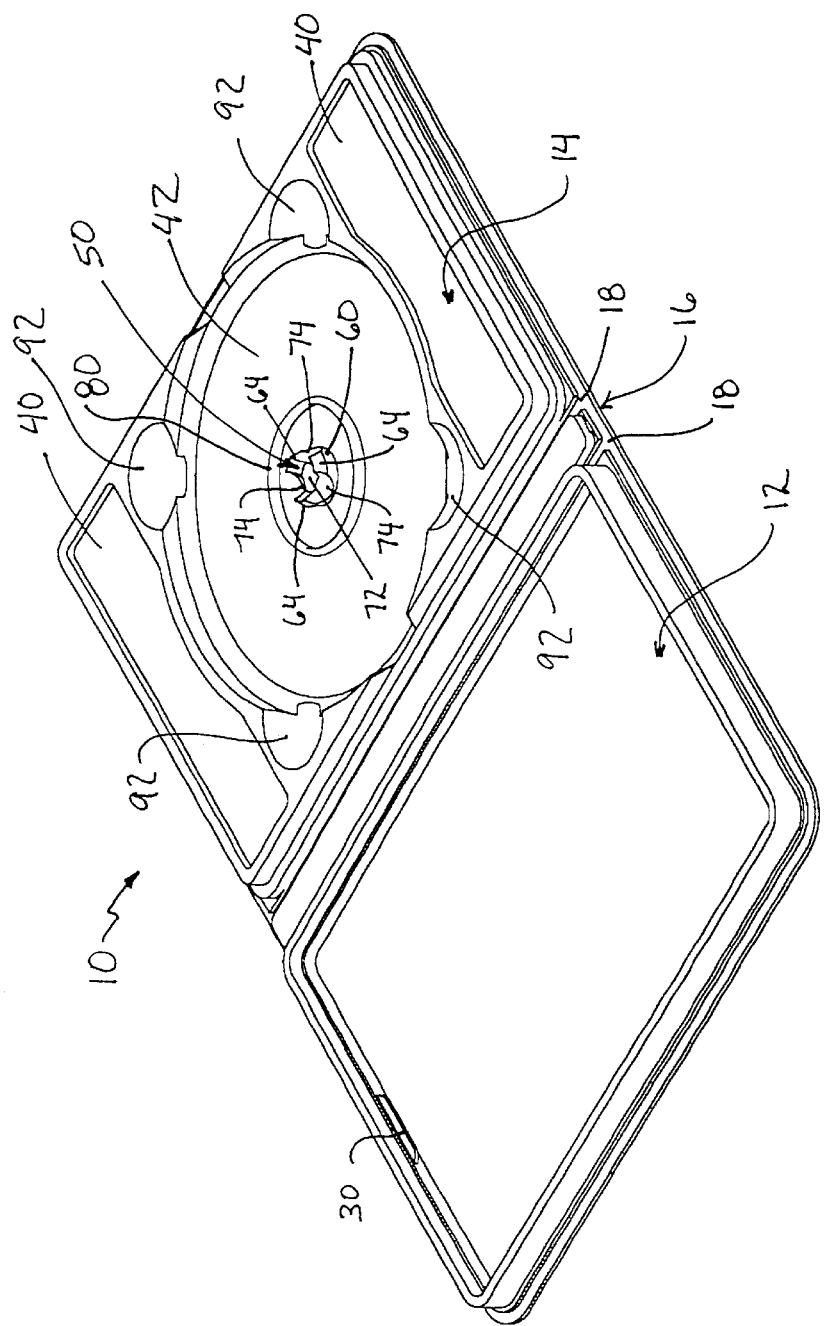
FIG. 1 is a perspective view of the storage container of the present invention.
Figure 5:
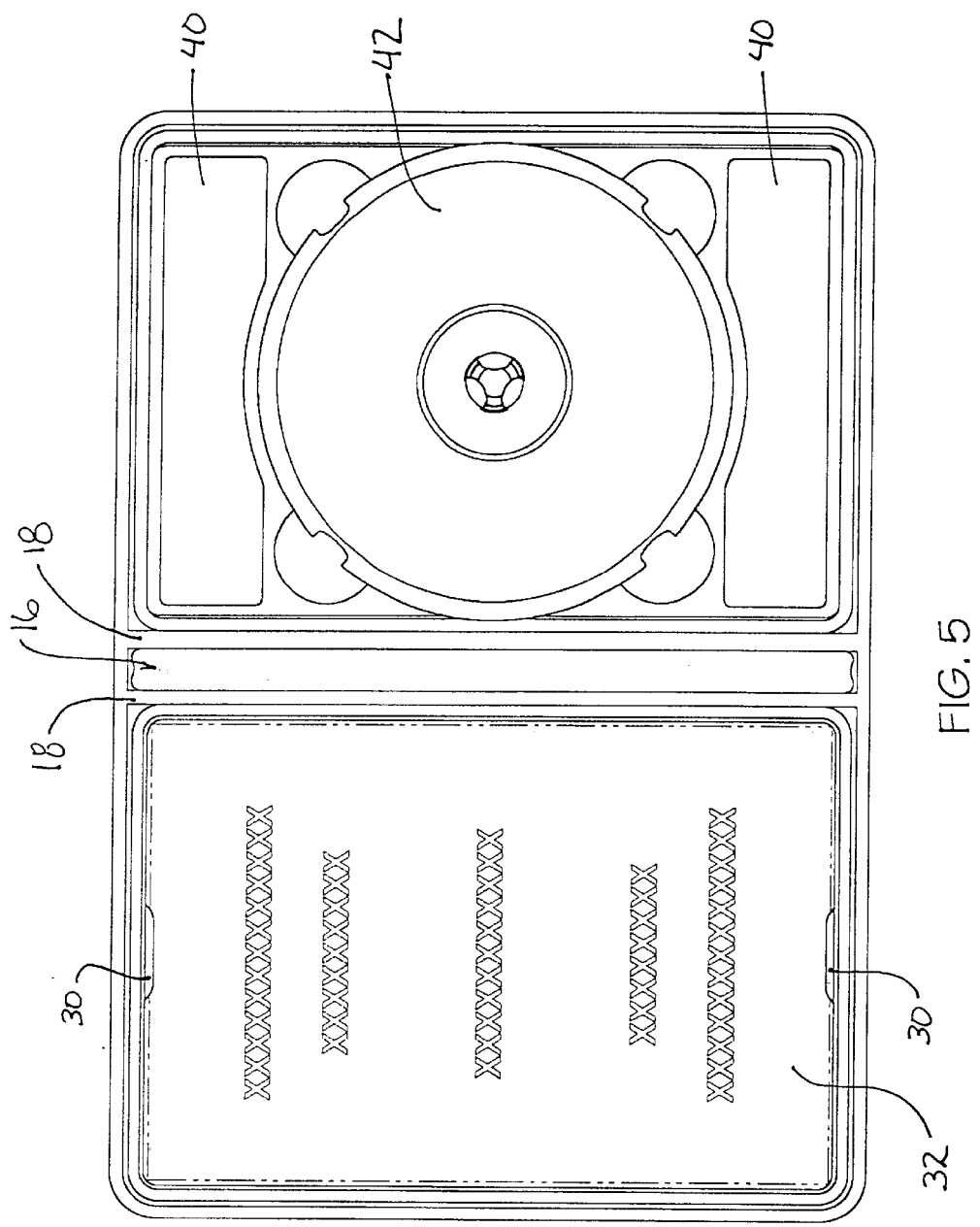
FIG. 5 is a view similar to FIG. 2 showing literature being held in the storage container.

The storage container of the present invention is indicated generally by the numeral 10 in the accompanying drawings. Container 10 generally includes a lid 12 connected to a base 14 by a hinge 16. Hinge 16 includes a pair of spaced apart living hinges 18. Container 10 is vacuum-formed by known methods and thus includes an upper sheet 20 secured to a lower sheet 22 at least about the perimeter of sheets 20 and 22. Hinge 16 may include stiffening members as are known in the art.

Lid 12 includes a pair of opposed literature holding projections 30 that extend outwardly from the sidewalls of lid 12. Projections 30 are sized to receive the edges of printed literature 32 that may accompany the item of recorded media that is stored in container 10. Each projection 30 projects inwardly from a sidewall of lid 12 from a location spaced above the bottom wall of lid 12 such that a literature booklet may be snapped between projection 30 and the bottom wall of lid 12. Each projection 30 is disposed centrally with respect to the sidewall of lid 12.

Base 14 includes a pair of indented areas 40 disposed on either side of the disc storage area 42. Indented areas 40 allow inserts to be placed in container 10 that may contain advertising information or other printed information. Indented areas 40 also help rigidify base 14.

Base 14 includes a hub 50 that is configured to securely hold a disc-shaped item of recorded media 52 having a centrally disposed opening 54. Hub 50 includes an outer cylindrical wall 60 that extends substantially vertically from the bottom wall 62 of base 14. Three holding fingers 64 are disposed at the top of cylindrical wall 60. Each holding finger includes a protruding lip 66 configured to snap fit over the upper surface of item 52 when item 52 is forced over hub 50. Each holding finger 64 includes a first wall 68 that angles upwardly and inwardly from lip 66 and a second wall 70 that is angled downwardly and inwardly from the upper end of first wall 68. A common central floor 72 is disposed between each of the second walls 70. Each finger 64 further includes a pair of opposed sidewalls 74 that are curved and connected to one another as shown in FIG. 1 in a smooth curve. The curved nature of sidewall 74 provide hub 50 with strength to prevent hub 50 from collapsing. Walls 74 and walls 70 in combination with wall 60 prevents the user of container 10 from depressing hub 50 when they are removing disc-shaped item of recorded media 52. As shown in FIGS. 3 and 4, walls 68 and 70 join together at a point.

As may be seen in FIG. 4, wall 70 is positioned above item of recorded media 52 when item of recorded media 52 is disposed on hub 50. As may also be seen in FIG. 4, curved sidewalls 74 extend below item of recorded media 52 when item of recorded media 52 is disposed on hub 50.

Base 14 further includes a support ring 80 that surrounds hub 50 and holds the bottom of item 52 above bottom wall 62. The overall height of support ring 80 prevents item 52 from shaking itself loose while allowing item 52 to rotate on hub 50.

Base 14 further includes the circumferential ledge 90 that is convex when viewed from the position of hub 50. Ledge 90 supports the outer circumference of item 52 as shown in FIG. 4. A plurality of finger access holes 92 are disposed about area 42 to allow the user to grasp the outer edge of item 52 when removing item 52 from hub 50.

Item 52 is easily installed and removed from hub 50 because hub 50 is fabricated from vacuum-formed plastic that is resilient enough to allow the relatively rigid item 52 to be snapped over and off of fingers 64.

Accordingly, the improved disc storage container apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the disc storage container is constructed and used, the characteristics of the construction, and the advantageous new and useful results obtained; the new and useful structures, devices, elements, arrangements, parts, and combinations are set forth in the appended claims.

What is claimed is:

1. A media storage container for holding a disc-shaped item of recorded media wherein the disc-shaped item includes an inner opening, an outer circumferential edge, an upper surface, and a lower surface; the storage container comprising:
   a base;
   a hinge connected to the base;
   a lid connected to the hinge and moveable between open and closed positions;
   a hub connected to the base;
   the hub including a sidewall that extends upwardly from the base; the sidewall having an upper end;
   the hub including at least two holding fingers disposed adjacent the upper end of the sidewall;
   each holding finger having a protruding lip extending radially outwardly from the sidewall; and
   the hub also including a floor disposed between the holding fingers, the position of the floor being fixed with respect to the base.

2. The container of claim 1, wherein the hub is integrally formed with base.

3. The container of claim 2, wherein the base is integrally formed with lid.

4. The container of claim 3, wherein the base and lid are vacuum formed from an upper sheet and a lower sheet.

5. The container of claim 1, wherein the hinge includes two spaced apart living hinges.

6. The container of claim 1, wherein the lid includes literature holding projections.

7. The container of claim 6, wherein the literature holding projections are opposed.

8. The container of claim 6, wherein the lid includes a bottom wall and sidewalls projecting from the bottom wall; the literature holding projections extending inwardly from the sidewalls above the bottom wall.

9. The container of claim 8, wherein each literature holding projection is centered along a sidewall.

10. The container of claim 1, wherein the base defines a disc storage area and at least one indented area disposed adjacent the disc storage area.

11. The container of claim 10, wherein the base defines two indented areas with the disc storage area being disposed between the indented areas.

12. The container of claim 1, further comprising a support ring that substantially surrounds the hub; the support ring adapted to engage the lower surface of the item of recorded media when the item of recorded media is held on the hub.

13. The container of claim 12, wherein the support ring has an upper surface; the upper surface of the support ring being disposed below the protruding lips of the hub.

14. The container of claim 12, wherein the base includes a bottom wall; the support ring and hub extending up from the bottom wall; the support ring being spaced from the hub with a portion of the bottom wall being disposed between the support ring and hub.

15. The container of claim 14, wherein the portion of the bottom wall disposed between the support ring and hub is disposed at the same height as the portion of the bottom wall disposed radially outside the support ring.

16. The container of claim 1, wherein the protruding lip is disposed adjacent the upper end of the sidewall.

17. The container of claim 1, wherein each holding finger includes a first wall that angles up and radially inwardly from the protruding lip and a second wall that is angled downwardly and inwardly from the first wall.

18. The container of claim 17, wherein the first and second walls join together at a point.

19. The container of claim 1, wherein each holding finger includes opposed sidewalls that are curved and connected to one another.

20. The media storage container as defined in claim 1 wherein an upper portion of the sidewall has a greater diameter than a lower portion of the sidewall.

21. The container of claim 1 wherein the holding fingers selectively engage and disengage the disc-shaped item via a snap-fit engagement.

22. The container of claim 21 wherein the protruding lips are configured to snap fit over the upper surface of the disc-shaped item when the disc-shaped item is forced over the hub.

23. The container of claim 1 wherein the floor is substantially flat and parallel with the base and extends between the holding fingers.

24. The container of claim 1 wherein the sidewall of the hub extends substantially perpendicularly from the base.

25. A media storage container for holding a disc-shaped item of recorded media wherein the disc-shaped item includes an inner opening, an outer circumferential edge, and upper surface, and a lower surface; the storage container comprising:
   a base;
   a hinge connected to the base;
   a lid connected to the hinge and moveable between open and closed positions;
   a hub connected to the base;
   the hub including a sidewall that extends upwardly from the base; the sidewall having an upper end;
   the hub including at least two holding fingers disposed adjacent the upper end of the sidewall;
   each finger including a pair of opposed sidewalls, wherein each sidewall of one finger is connected to a sidewall of an adjacent finger; each sidewall extending below at least a portion of the item of recorded media when said item is disposed on the hub; and
   the hub also including a floor disposed between the holding fingers, the position of the floor being fixed with respect to the base.

26. The media storage container as defined in claim 25 wherein a second wall is disposed inwardly of the sidewall and extends downwardly from the upper end of the sidewall; the second wall being disposed above the item of recorded media when said item is disposed on the hub.

* * * * *